United States Patent [19]

Schröder

[11] Patent Number: 4,660,540

[45] Date of Patent: Apr. 28, 1987

[54] BAKING OVEN WITH HOT-AIR CIRCULATION HEATING

[75] Inventor: Helmüt Schröder, Bietigheim-Bissingen, Fed. Rep. of Germany

[73] Assignee: Werner & Pfleiderer, Stuttgart, Fed. Rep. of Germany

[21] Appl. No.: 778,253

[22] Filed: Sep. 13, 1985

[30] Foreign Application Priority Data

Sep. 15, 1984 [DE] Fed. Rep. of Germany ....... 3434000

[51] Int. Cl.$^4$ .............................................. A21B 1/28
[52] U.S. Cl. ................... 126/21 A; 126/1 F; 219/400; 432/177
[58] Field of Search ............... 99/447; 126/21 A, 1 F, 126/80; 219/400; 432/177

[56] References Cited

U.S. PATENT DOCUMENTS

| 2,691,432 | 10/1954 | Klein et al. | 126/1 F |
| 3,435,754 | 4/1969 | Löhr et al. | 99/341 |
| 3,836,220 | 9/1974 | Ishammar | 312/236 |
| 4,052,589 | 10/1977 | Wyatt | 219/400 |
| 4,215,265 | 7/1980 | White | 219/390 |

FOREIGN PATENT DOCUMENTS

| 10298 | 8/1902 | Austria . | |
| 2136705 | 5/1972 | Fed. Rep. of Germany . | |
| 2519849 | 11/1975 | Fed. Rep. of Germany ... | 126/21 A |
| 3039036 | 5/1982 | Fed. Rep. of Germany ...... | 126/1 F |
| 2535578 | 5/1984 | France | 126/21 A |
| 84-1266 | 4/1984 | PCT Int'l Appl. | 126/21 A |

Primary Examiner—Samuel Scott
Assistant Examiner—Allen J. Flanigan
Attorney, Agent, or Firm—Roberts, Spiecens & Cohen

[57] ABSTRACT

A baking oven comprising a hot-air circulating heating system by which hot air is heated and circulated through a baking chamber from a heating and circulating device arranged above the baking chamber. The heated air contacts the articles to be baked which are present in a multi-tier rack in the baking chamber. The baking chamber is defined by a housing which is formed of several sections and includes a cover, a floor and vertical walls. The walls are provided with insulation which is covered by a cowling. In the front wall is an opening which extends from the floor to the cover for the introduction and removal of the rack. The opening can be closed by a door. The housing is composed of a plurality of segments of the same outer contour which are stacked on one another, the uppermost segment containing the cover and the heating and circulating device, the lowermost segment containing the floor, the vertical walls being formed by at least two segments.

13 Claims, 5 Drawing Figures

BAKING OVEN WITH HOT-AIR CIRCULATION HEATING

FIELD OF THE INVENTION

The present invention relates to improvements in the construction of a baking oven having hot-air circulation heating.

PRIOR ART

The basic construction of baking ovens of the above-mentioned type, also known as baking cabinets, is known, for instance, from Federal Republic of Germany OS No. 24 35 138. In these baking cabinets, a multi-tier rack, generally constructed as a cart, stands immovably on the floor of the baking chamber during the baking operation, and the hot air is circulated alternately in opposite directions through the baking chamber and the tiers of the rack.

Also known are baking cabinets disclosed in Federal Republic of Germany OS No. 14 32 916 in which a mobile multi-tier rack is supported on a rotary disk which rotates during the baking. Thereby, the hot air can circulate continuously in the same direction.

The known baking cabinets are, in general, constructed in such a manner that the housing which surrounds the baking chamber is located in a frame formed of profiled bar material within which frame the heating and circulating means as well as the switch box are also arranged. On the outside of the frame, cowling plates are fastened and the space between the housing and the cowling plates is filled with insulating material.

Baking cabinets are finding increased use in small bakeries. However, the space available for them is frequently very limited. In particular, the height of the bakery room and the size of its doors is frequently so limited that the baking cabinets must be delivered in disassembled state and assembled on location.

For this purpose, in the known baking ovens, the housing is divided into two sections along a vertical plane which passes through the supply opening, said sections being then bolted together in the baking room. If it is borne in mind that in many cases the height of the baking room is only 2.4 meters for the setting up of the baking cabinet and ordinary door openings are of a width of 1 meter and a height of 2 meters, relatively long and cumbersome parts result from the vertical subdivision of the housing of a baking cabinet which substantially fills the entire height of the room. Aside from the fact that the bolting together of the housing as well as the assembling of the frame and the other components of the baking cabinet is very difficult under cramped conditions, there is the additional difficulty of having the joint which extends above the floor of the baking chamber sufficiently tight so that no condensate emerges thereat.

Although some of the known baking cabinets are already substantially preassembled, a considerable amount of work is still required for erecting the baking cabinet, in addition to which, in certain cases, welding must also be effected for the vapor-tight connecting of housing parts, air conduction ducts, etc.

In Federal Republic of Germany Pat. No. 604 749 there is disclosed a disassemblable baking oven which has baking chambers made of steel plate which are inserted in a heat-insulated shell, the baking chambers and the heating ducts located between them being made of sheet-metal hoods stacked one above the other and held together by clamping bolts. The lower edge of each hood rests tightly on top of the sheet-metal hood therebelow. This baking oven is not a baking cabinet but, rather, a multi-tier baking oven in which several self-contained baking chambers, each having its own separate heating means, are arranged one above the other. The heating of the baking chambers is effected indirectly by radiation, while in the type of baking oven known as a baking cabinet, convection heating by the circulation of hot air in the baking chamber is effected.

SUMMARY OF THE INVENTION

An object of the present invention is to provide an improved baking oven which can be assembled with little expenditure of labor and time, particularly in constricted spaces and can be easily adapted in height to local conditions.

This and further objects are achieved in accordance with the invention by the construction of a baking oven comprising a housing defining a baking chamber and including a plurality of stacked segments placed one on top of the other and comprising an upper segment, an intermediate segment, and a lower segment. The segments are self-contained and when stacked on one another collectively form the housing and provide the oven in substantially ready condition for operation. The upper segment includes heating and circulating means for hot air and a cover for the baking chamber disposed beneath said heating and circulating means. The lower segment includes a floor on which a rack containing the goods to be baked can rest. At least two of the segments include vertical walls which collectively form vertical walls of the baking chamber when the segments are stacked on one another.

In contradistinction to the ovens of the prior art, in the baking oven or baking cabinet of the invention, the housing which surrounds the baking chamber is subdivided along horizontal planes, whereby substantially block-shaped segments are produced, the height of which can be so dimensioned that they can be conveniently passed through conventional door openings. The assembly of the baking oven is effected in simple manner by stacking the segments one on top of the other, a relatively rigid connection resulting merely due to their own weight. Expensive bolting or welding connections are unnecessary. By the use of different heights of the segments it is possible to assemble baking ovens which optimally utilize the space available in bakeries, the heights of the segments which define the top and bottom of the baking chamber preferably remaining unchanged. The segments can be completely preassembled at the manufacturing plant so that upon stacking of the segments at the place of use, the baking oven is substantially ready for operation. The result of the invention, therefore, is not only a considerable simplification in the final assembling of the baking oven but also a considerable rationalization of the manufacture as well as of the storing and transportation of the segments.

BRIEF DESCRIPTION OF THE FEATURES OF THE DRAWING

DETAILED DESCRIPTION

Figure 1:
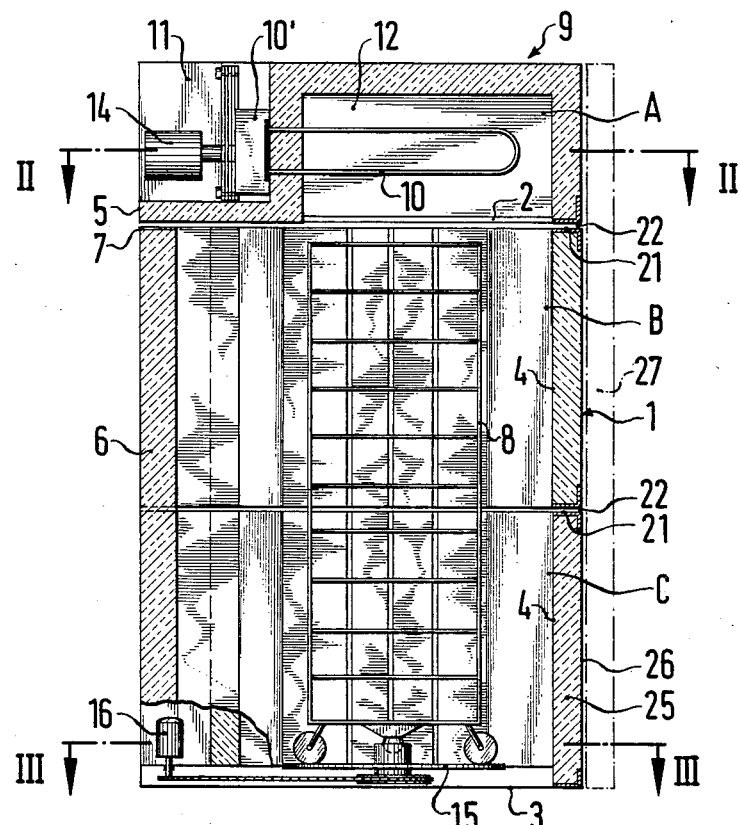
FIG. 1 is a vertical sectional view through a baking oven according to the invention formed of segments stacked one on top of the other.
Figure 2:
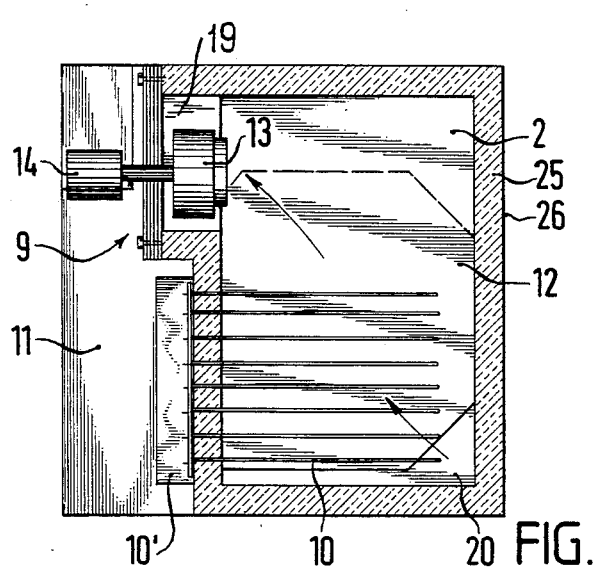
FIG. 2 is a horizontal sectional view taken along line II—II in FIG. 1.
Figure 3:
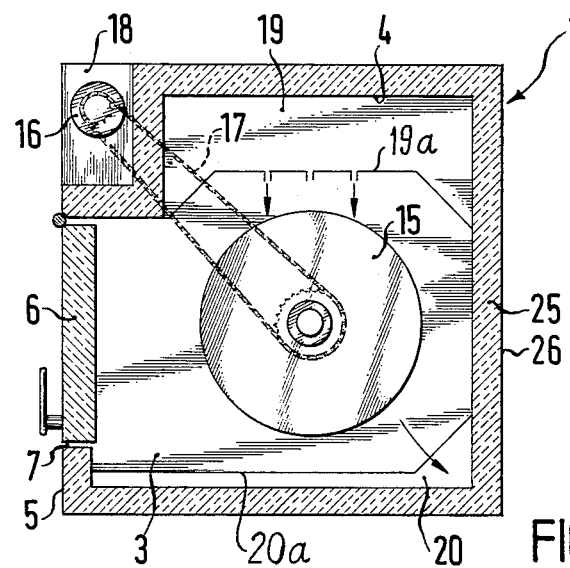
FIG. 3 is another horizontal sectional view taken along line III—III in FIG. 1.

In the drawing there is seen a baking oven which comprises a housing 1 enclosing a baking chamber. The housing includes a cover 2 at the top thereof. The bottom of the housing includes a floor 3. The housing further includes vertical walls 4 arranged around the baking chamber. The front wall 5 has an opening 7 which extends from the floor 3 to the cover 2 and which can be closed by a door 6. The opening 7 serves for the introduction and removal of a multi-tier rack 8 which carries the goods to be baked. The multi-tier rack 8 is movable on rollers. The material or goods on the rack 8 is baked by hot air which is heated and circulated through the baking chamber by a heating and circulating device 9 arranged above the baking chamber.

For heating the circulated air, electric heating rods 10 are employed in the illustrated embodiment. Instead of heating rods, a heat exchanger could be employed which is heated by an oil or gas burner, in which case the burner would be arranged in a common recess 11 at the top at the front wall 5, in which are disposed the connections 10' for the heating rods in the embodiment shown. The heating rods 10 or the optional heat exchanger are disposed in a suction chamber 12 of a circulating fan 13 whose drive motor 14 is also arranged in the recess 11. In this way, the parts of the heating and circulating device 9 are easily accessible from the front of the baking oven.

On the floor 3 of the housing there is mounted a rotary disk 15 on which the movable multi-tier rack 8 stands and which is driven in rotation by a chain 17 from an electric motor 16 arranged outside the baking chamber. The drive motor 16 is arranged in a vertical recess 18 at the front wall 5. A switch box (not shown) is placed in this same recess upon assembly of the baking oven, and the different devices of the baking oven can be controlled from this box.

On opposite sides within the housing 1 there are formed a pressure duct 19 and a suction duct 20 for the flow of the heating air. In particular, the ducts 19 and 20 are formed by plates 19a, 20a provided with operative means in the form of slotted nozzles or holes, the plates being of polygon shape adapted to the periphery of the rotary disk 15. The suction duct 20 opens directly into the suction chamber 12 which is located above the baking chamber and contains the heating rods 10, and the heated air is forced by the circulating fan 13 into the pressure duct 19 located directly therebeneath and then into the heating chamber. This arrangement results in a compact construction for the heating and circulating device 9.

According to the invention, the baking oven is formed of three segments A, B and C, stacked one on top of the other. The segments all have the same outer contour, which is approximately square, in the illustrated embodiment. The uppermost segment A contains the cover 2 of the housing with the heating and circulating device 9 arranged thereabove. The lowermost segment C comprises the floor 3 and a part of the vertical walls 4. The central segment B has only vertical walls 4. so that the vertical walls 4 of the housing are formed by at least two segments.

The segments A, B and C have horizontal stacking surfaces 21 which face each other and by which the segments rest on each other to assure a dependable mutual support of the segments on one another. The stacking surfaces are preferably formed by horizontally bending the vertical walls 4 outwardly. Seals 22 of heat-resistant material are arranged between the stacking surfaces 21. The seals 22 are made, for example, of flat silicone rubber or of fiberglass cloth and can be fastened as self-adhesive strips to the respective stacking surfaces 21, preferably the upwardly facing stacking surfaces of the segments. The stacking surfaces 21 impart such great stability to the segments that housing 1 in operable state is produced merely by placing the segments on top of each other. If necessary, simple clamps can secure the segments to each other.

Figure 4:
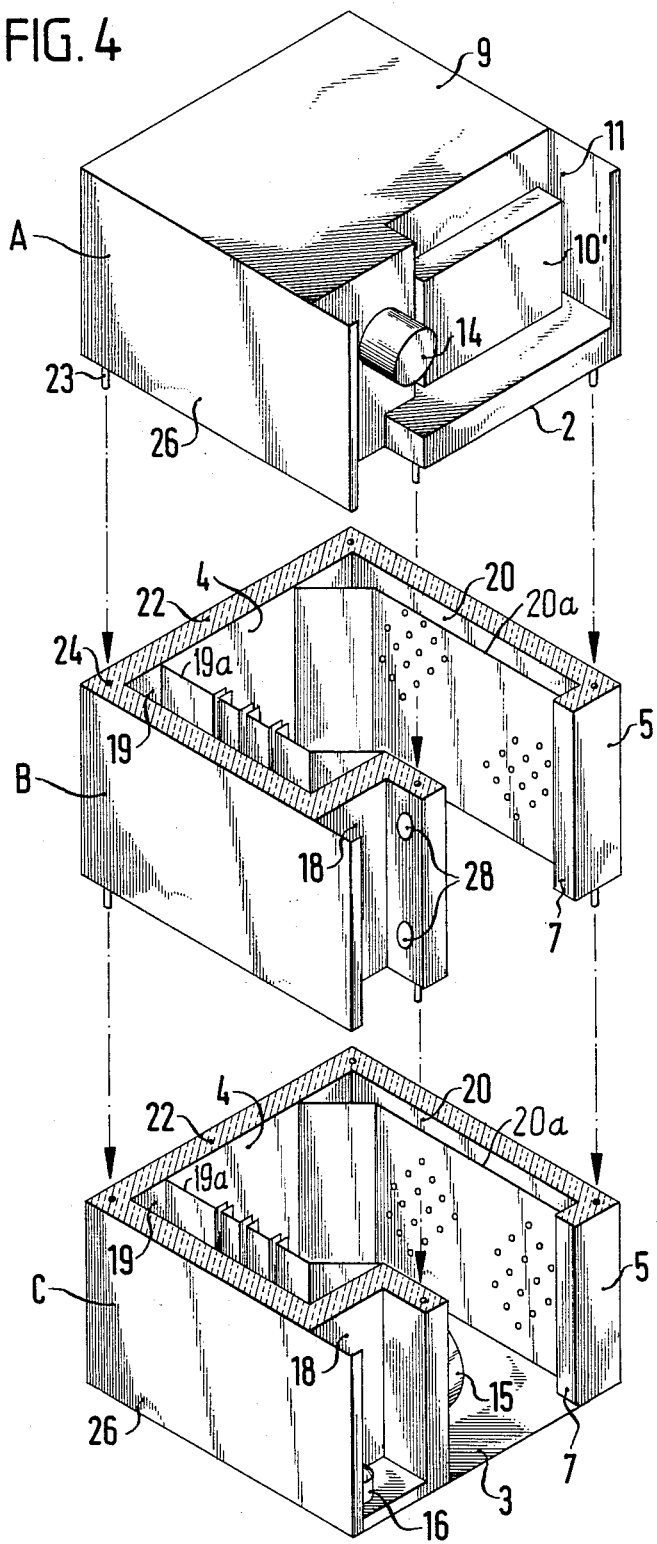
FIG. 4 is an exploded perspective view of the baking oven of FIG. 1 showing the segments spaced from each other.

In order to align the segments accurately upon stacking, the stacking surfaces 21 are provided with interengaging attachments which, as shown in FIG. 4, consist of at least two dowel pins 23 on the stacking surface of the one segment and corresponding holes 24 on the facing stacking surface of the other segment. Other suitable means can be employed, such as tongues and grooves.

The segments B and C are advantageously constructed such that the vertical walls of each segment consist of metal plates which are bent at the top and bottom to form a U-shape. Heat insulation 25 is arranged in the space disposed between the planes of the arms of the U-shaped bends as best seen in FIG. 1. The insulation 25 can be mats of glass wool or rock wool which are held in place without additional fastening means between the arms. The horizontal webs of the U-shaped bends form the stacking surfaces 21.

For adaptation to different heights of the baking chamber, it is preferable that only the height of the central segment B be changed, since it has only vertical walls. The height of the lowermost segment C and, particularly, the height of the uppermost segment A, are maintained for all sizes of the baking oven in view of the operating devices contained therein.

It is advantageous that the vertical walls of each segment be less than 1000 mm in height and preferably about 950 mm. This is especially true for the segment B in the embodiment shown as it is the largest of the three segments having dimensions of 1400×1400×950 mm. With these dimensions, the segment B can still be transported through door openings of a width of 1 meter and a height of 2 meters. The height of 950 mm of a segment is also favorable for the reason that alloy-steel plates of a standard width of 1250 mm can then be used with minimal cutting.

Figure 5:
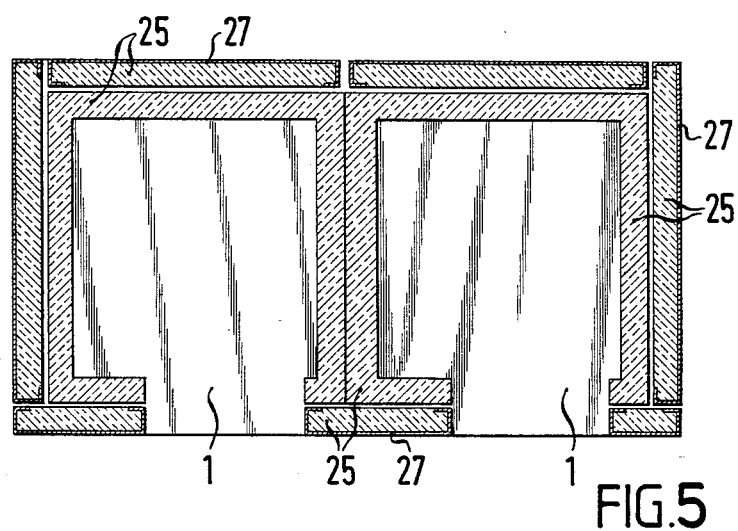
FIG. 5 is a horizontal sectional view through a baking oven having two adjacent baking chambers.

The insulation 25 arranged on the outside of the walls 4 is covered by outer walls or cowlings 26, each of which extends over the height of one segment. The entire insulation required need not necessarily be applied directly to the outer surfaces of the walls 4, but a part of the insulation can also be contained in a cassette 27 which is fastened to the outside of the wall 4. This arrangement is shown in FIG. 5, in which two housings 1 each formed of stacked segments are arranged directly adjacent one another and the assembly thus produced is covered on its outer surfaces with the cassettes 27 which contain the additional insulation 25. With such an assembly of a battery of two or more baking ovens, it may be sufficient if only the cassettes on the visible sides consist of alloy steel. The sides which lie against the wall of the bakery room or are otherwise concealed can then be covered with cassettes of galvanized steel plate. It is advantageous for the cassettes to extend over the entire height of the baking oven since heat bridges are then avoided at the joints of the segments. Such an arrangement of the cassettes 27 is shown in chain-dotted lines in FIG. 1.

The segments A, B, C are completely assembled at the baking site. By merely stacking the segments on one another without the need of specially trained assembly personnel, a complete baking oven is produced. In this regard, the segment A contains the heating and circulating means with its control means for temperature limits and its draft control means set for operation, the segment B contains an illuminating system 28, and the segment C contains the rotary disk 15 and its drive means. An illuminating system can also be arranged in the cover 2 in the vicinity of the opening 7, i.e., therefore in the segment A, so that the segment B does not have any electrical parts at all. The segments B and C also contain sections of the plates 19a, 20a which form the pressure duct 19 and the suction duct 20. The plates can be of a shape other than polygonal. The plates 19a, 20a may also be separate structural parts which extend over the entire height of the baking chamber and are inserted only after the housing 1 has been formed by the stacking of the segments A, B, C. After the door 6 has been attached at the opening 7 and the switch box (not shown) installed in the recess 18, and the prepared electrical connections have been made between the parts of the electric system, the baking oven is ready for operation.

Although the invention has been described in relation to preferred embodiments thereof, it will become apparent to those skilled in the art that numerous modifications and variations of the invention can be made within the scope and spirit thereof as defined in the attached claims.

What is claimed is:

1. A baking oven comprising a housing defining a baking chamber and including a plurality of stacked segments placed one on top of the other and comprising an upper segment, an intermediate segment and a lower segment, said segments being self-contained and when stacked on one another collectively forming the housing and providing the oven in substantially ready condition for operation, said upper segment including heating and circulating means for hot air and a cover for the baking chamber disposed beneath said heating and circulating means, said lower segment including a floor on which a rack containing the goods to be baked can rest, at least two of said segments including vertical walls which collectively form vertical walls of said baking chamber when the segments are stacked on one another, said segments resting on one another via horizontal stacking surfaces thereof, said baking chamber extending between said cover and said floor and being bounded by said vertical walls of the stacked segments, the weight of the stacked segments being such to maintain the segments stably supported on one another, the intermediate segment being formed substantially only by said vertical walls whereby the height of the oven can be varied according to the height of the intermediate segment while the upper and lower segments are retained.

2. A baking oven as claimed in claim 1 wherein said segments have the same outer contour.

3. A baking oven as claimed in claim 2 wherein said segments have horizontal stacking surfaces facing one another and including seal means of heat-resistant material disposed between adjacent stacking surfaces.

4. A baking oven as claimed in claim 3 comprising interengaging means on adjacent segments for aligning the segments when they are stacked on one another.

5. A baking oven as claimed in claim 1 wherein said housing is provided with an opening extending from said floor to said cover, said oven further comprising a door at said opening providing access to and from the baking chamber for said rack.

6. A baking oven as claimed in claim 1 wherein said vertical walls of said segments include ends respectively bent to form U-shaped sections with spaced, opposed arms, said oven further comprising insulation means on said walls between the arms.

7. A baking oven as claimed in claim 1 wherein the vertical walls in each segment have a height less than 1000 mm.

8. A baking oven as claimed in claim 1 comprising plate means forming suction and pressure ducts within the baking chamber in communication with said heating and circulating means when the segments are stacked on one another.

9. A baking oven as claimed in claim 8 wherein said plate means includes plates in said intermediate and lower segments spaced from the respective vertical walls to form said suction and pressure ducts, said plates being provided with aperture means for establishing communication between said ducts and the goods in said baking chamber.

10. A baking oven as claimed in claim 9 wherein said upper segment is provided with a suction chamber communicating with said suction duct for heating air from the baking chamber by said heating and circulation means to produce heated air which is fed to said pressure duct.

11. A baking oven as claimed in claim 9 wherein said intermediate segment includes said plates adjacent said vertical walls.

12. A baking oven as claimed in claim 1 wherein said floor of the lower segment includes a rotary disk for support of the rack and said lower segment includes means for rotating said disk.

13. A baking oven comprising a housing defining a baking chamber and including a plurality of stacked segments placed one on top of the other and comprising an upper segment, an intermediate segment and a lower segment, said segments being self-contained and when stacked on one another collectively forming the housing and providing the oven in substantially ready condition for operation, said upper segment including heating and circulating means for hot air and a cover for the baking chamber disposed beneath said heating and circulating means, said lower segment including a floor on which a rack containing the goods to be baked can rest, at least two of said segments including vertical walls which collectively form vertical walls of said baking chamber when the segments are stacked on one another, and cassettes with insulation means on the outside of said vertical walls.

14. A baking oven as claimed in claim 13 wherein said cassettes extend over the entire height of the oven.

* * * * *